US008531355B2

(12) United States Patent
Maltz

(10) Patent No.: US 8,531,355 B2
(45) Date of Patent: Sep. 10, 2013

(54) UNITIZED, VISION-CONTROLLED, WIRELESS EYEGLASS TRANSCEIVER

(76) Inventor: Gregory A. Maltz, Sunnyvale, CA (US)

(*) Notice: Subject to any disclaimer, the term of this patent is extended or adjusted under 35 U.S.C. 154(b) by 426 days.

(21) Appl. No.: 12/842,315

(22) Filed: Jul. 23, 2010

(65) Prior Publication Data

US 2012/0021806 A1    Jan. 26, 2012

(51) Int. Cl.
*H04W 74/00* (2009.01)

(52) U.S. Cl.
USPC .............................. 345/8; 455/556

(58) Field of Classification Search
USPC ............................................. 345/8
See application file for complete search history.

(56) References Cited

U.S. PATENT DOCUMENTS

| | | | | |
|---|---|---|---|---|
| 4,867,551 | A * | 9/1989 | Perera | 351/158 |
| 5,270,748 | A | 12/1993 | Katz | |
| 5,623,703 | A | 4/1997 | Takagi et al. | |
| 5,654,827 | A * | 8/1997 | Reichert | 359/631 |
| 5,850,211 | A * | 12/1998 | Tognazzini | 345/158 |
| 5,886,822 | A * | 3/1999 | Spitzer | 359/630 |
| 6,091,546 | A * | 7/2000 | Spitzer | 359/618 |
| 7,648,236 | B1 * | 1/2010 | Dobson | 351/158 |
| 2004/0070567 | A1 * | 4/2004 | Longe et al. | 345/156 |
| 2005/0206583 | A1 * | 9/2005 | Lemelson et al. | 345/7 |
| 2006/0061544 | A1 * | 3/2006 | Min et al. | 345/156 |
| 2008/0168386 | A1 * | 7/2008 | Brinda et al. | 715/786 |
| 2009/0079835 | A1 | 3/2009 | Kaplan et al. | |
| 2010/0149073 | A1 * | 6/2010 | Chaum et al. | 345/8 |
| 2010/0245585 | A1 | 9/2010 | Fisher et al. | |
| 2011/0086675 | A1 * | 4/2011 | Brinda et al. | 455/566 |

OTHER PUBLICATIONS

Oyekoya, "Eye Tracking: A Perceptual Interface for Content Based Image Retrieval," Ph.D. Thesis, 2007, Department of Electronic & Electrical Engineering, University College London (233 pages).
Selker, et al., "Eye-R, a Glasses-Mounted Eye Motion Detection Interface," Conference on Human Factors in Computing Systems, CHI 2001, pp. 179-180 (2 pages).
Kozma, et al., "GaZIR: Gaze-Based Zooming Interface for Image Retrieval," ICI-MLMI 2009 (8 pages).

* cited by examiner

*Primary Examiner* — Alexander S Beck
*Assistant Examiner* — Mihir Rayan
(74) *Attorney, Agent, or Firm* — Stephen E. Zweig

(57) ABSTRACT

A device allowing a user to inconspicuously send and receive wireless messages, often short text messages. The device may have an outward appearance resembling standard eyeglasses or sun glasses, and comprise a built in wireless transceiver and an optical display that enables the user to inconspicuously view incoming wireless text messages. The device allows the user to inconspicuously transmit outgoing text messages by a process in which the user simply moves his or her eyes and gazes at various display targets. The device's eye tracking systems and software track the motion and gaze of the user's eyes, and convert this gaze into message symbols and system control commands. The device then transmits the resulting messages using its transceiver. In a preferred embodiment, the device is self-contained and operates, when placed on the user's head, without the need of external battery packs or external transceivers.

19 Claims, 8 Drawing Sheets

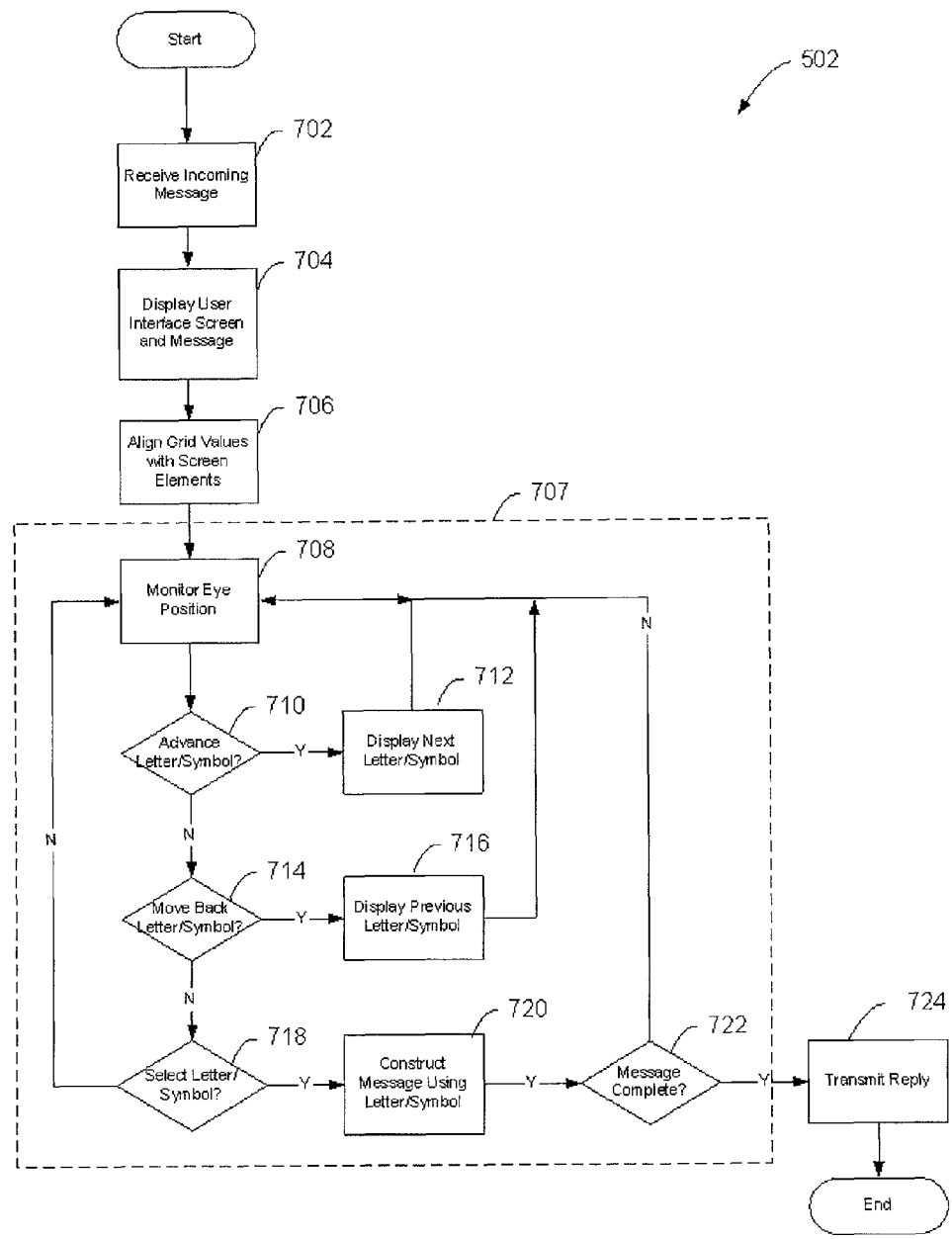

UNITIZED, VISION-CONTROLLED, WIRELESS EYEGLASS TRANSCEIVER

BACKGROUND OF THE INVENTION

1. Field of the Invention

The invention relates to the fields of eye tracking devices and optical user interfaces, particularly as applied to the control of wireless communications.

2. Description of the Related Art

As cellular telephones and other mobile devices have proliferated, so has the expectation that individuals will always have the option to instantly communicate with their contacts. Thus, in both business and in private matters, when an individual is not able to instantly respond to at least text messages, this expectation goes unmet, and social friction and/or lost business opportunities can result. Although cell phone and text communications are often infeasible during certain times of the day, the perception remains that the only reason why the recipient of a message may not have responded is due to a deliberate desire of the recipient to ignore the message.

However, the act of turning on a cell phone, scrolling through incoming text messages, and then responding to the text messages can be obtrusive, conspicuous, and in some situations, inappropriate. Thus, there are many times when it is inadvisable or socially awkward to break off a conversation to respond to an incoming cellular phone text message. Indeed, an important client or loved one may be insulted if this occurs. Thus, at present, a cell phone user is faced with the difficult problem of trying to balance priority between the environment, e.g., a person they are talking to face-to-face, versus the person who is trying to contact them.

There have been efforts in the past directed to the use of eye movements to control devices. However, these efforts have largely involved the use of bulky, obtrusive equipment. Prior art devices utilize optical correction lenses and mirrors that optically correct the display so as to create the appearance of a virtual image of the display that appears to be originating from a much further distance. Beam splitters, often semi-silvered mirrors or other optical glass, often located at a 45 degree angle between the user's eyes and various distant objects, can then allow the user to simultaneously see both a virtual image of the display in proper focus, as well as images of other distant objects. Unfortunately, prior art head-mounted frames (e.g., eyeglasses frames) that utilized beam splitters to create a virtual image viewable by the user traditionally configured the beam splitter so that it was held out in front of the eyeglass lenses. This traditional configuration is so conspicuous and bulky as to give the user an artificial human "Cyborg" like appearance. For purposes of inconspicuous communication using a head-mounted device that is attractive to the user, this prior art configuration is unsuitable.

Accordingly, what would be desirable is a wireless communications system that allows for inconspicuous communications by the user while allowing for eye control of such communications. More particularly, improved communications devices and methods are needed that enable the user to discretely or inconspicuously receive and respond to at least short incoming text messages in a way that is both consistent with the distant parties desire and expectation of instant communications, and is also consistent with the other local parties expectation of undivided attention.

BRIEF SUMMARY OF THE INVENTION

The invention provides a device and method for allowing a user to inconspicuously send and receive messages and other information, often short text communications. The present invention minimizes any outward appearance that the user is engaging in the process of receiving and transmitting wireless messages and is visually inconspicuous, since an unusual looking piece of equipment will itself attract unwanted attention.

In one embodiment, the invention has an outward appearance resembling standard eyeglasses or sun glasses, has a built in wireless transceiver, and the device enables a user to discretely view incoming wireless text messages using an optical display built into the eyeglass frame. The invention also allows the user to discretely transmit outgoing text messages by a process in which the user simply moves his or her eyes and gazes in various defined directions. The device's eye tracking systems and artificial vision or video interpretation software can track the motion or gaze of the user's eyes, and convert this motion and gaze into message symbols and commands. The device then transmits the resulting message. In a preferred embodiment, the invention is self-contained and operates, when placed on the user's head, without the need of external battery packs or external transceivers.

BRIEF DESCRIPTION OF THE DRAWINGS

FIGS. 7A-7B are flowcharts showing processing steps capable of being carried out by the control software of the device.

DETAILED DESCRIPTION OF THE INVENTION

Figure 1:
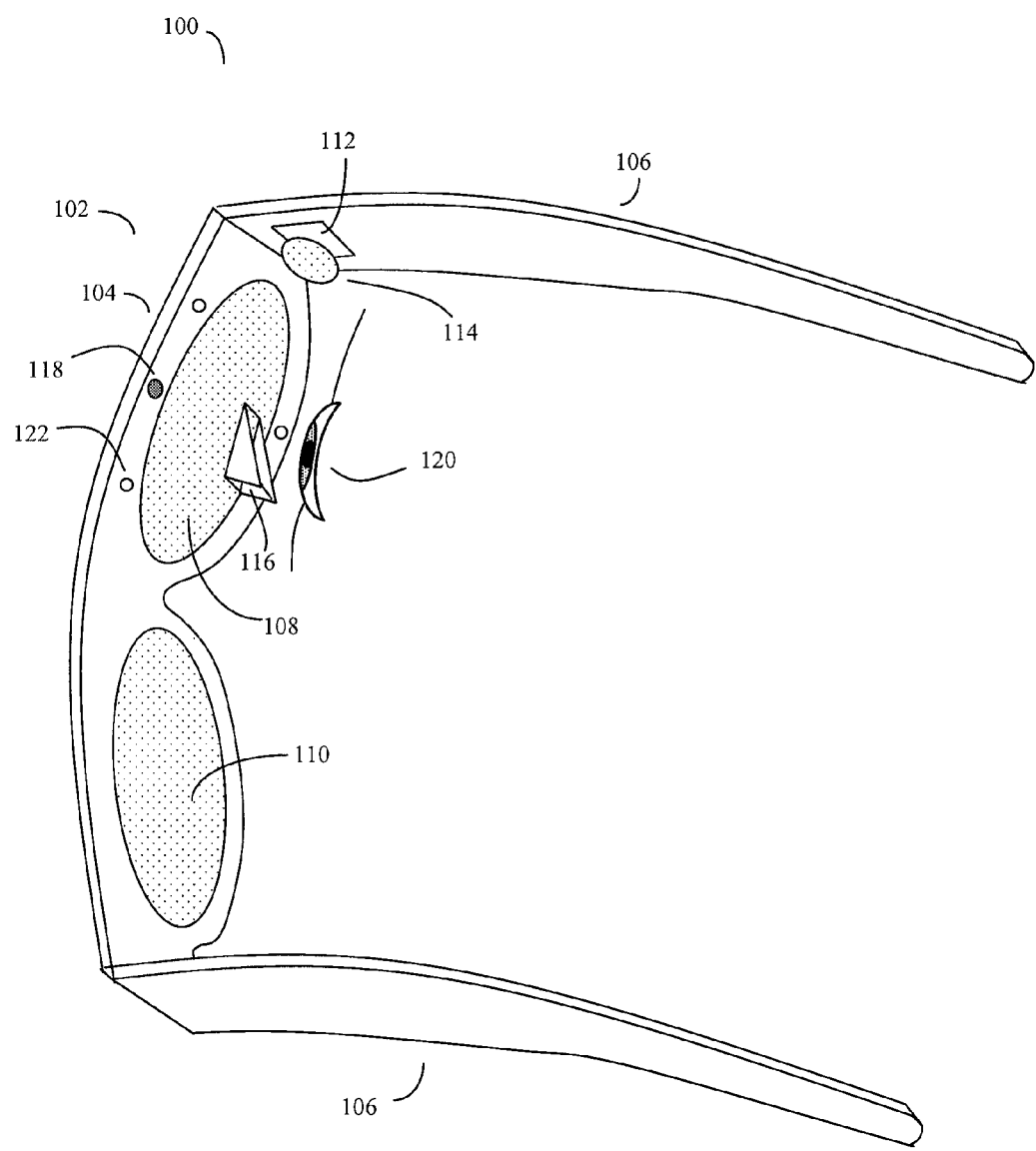
FIG. 1 shows an overview of the device.

In one embodiment, the invention may be a unitized or self-contained, head-mounted, combination eye-tracking and display device for transmitting and receiving information. This device may generally comprise a head-mountable frame, such as an eyeglasses frame, configured to hold one or more lenses (such as two eyeglasses lenses) in front of the user's eye or eyes.

The device may also comprise at least one user eye-tracking sensor, such as a miniature video camera, positioned to track movement of one or both eyes of the user. The at least one eye-tracking sensor could be mounted on the head-mountable frame. The device may also comprise at least one processor, such as a microprocessor or digital signal processor, programmed to execute eye tracking executable code and control other communications and interface executable code as well.

The device may also comprise at least one optical system mounted or configured to render a virtual image of a visual display viewable by the device's user. This optical system may be spatially positioned in the space within or between a boundary defined by a lens, such as one of the two eyeglasses lenses, positioned in front of the eye of the user, and the eye of the user.

The device may also comprise at least one wireless transceiver positioned in close proximity to the head-mounted frame (and which could be attached to or integrated into the frame). This wireless transceiver may be configured to receive wireless information from outside sources, and to transmit this wireless information (e.g. text messages, email) to the visual display.

The device may also comprise at least one processor programmed to execute eye tracking code (software) and other executable control code. This eye tracking code, which will be discussed in more detail later on in the specification, can, in the case where the eye-tracking sensor is a miniature video camera, comprise artificial vision software to interpret the images obtained by the camera, and extract eye gaze direction information. This eye gaze direction information can then be analyzed and used to control the device by other software algorithms and executable code.

The executable control code has multiple functions. It controls the user display and interface, and also takes commands from the eye tracking code and in turn command the device to transmit wireless information.

The eye tracking sensor tracks the motion of the user's eyes, and translates the motion of the user's eye into at least one symbol or command. The device is configured to then transmit this at least one symbol or command using the device's wireless transceiver, and the device may also display received symbols for the user to view using the device's optical system.

The invention may be a self-contained head-mounted combination eye-tracking and display device for sending and receiving wireless information by a user. The invention may comprise a head-mounted frame, such as an eyeglasses frame, configured to hold lenses in front of the user's eyes, and may have at least one user eye-tracking sensor mounted on this frame.

The eye tracking sensor may often comprise one or more infrared light sources and one or more video camera(s) configured to detect near infrared light. These near-infrared light source(s) may be configured to shine near infrared into the user's eye or eyes, thus illuminating the user's eye or eyes. The video camera(s) in turn may be configured to focus onto these near-infrared illuminated eyes.

The device may also comprise at least one processor (such as a microprocessor), eye tracking software and control software, as well as at least one visual display and an optical system mounted on the head-mounted frame. The optical system includes a beam splitter and a converging lens or converging mirror, and is configured to produce a virtual image of the visual display that is viewable by a user of the device. The optical system may be configured to not spatially extend beyond the eyeglasses lenses in front of the user's eyes.

The visual display may display data such as at least one visual target for a symbol intended for wireless transmission when the user's eyes are directed at this target. The device may also comprise at least one wireless transceiver mounted on this head-mounted frame. The device may also be configured so that the wireless transceiver may receive wireless information, and send this wireless information to the visual display. The device may also be configured so that the at least one processor, eye tracking software, and other control software can direct the device to transmit wireless information by tracking the motion of the user's eyes using the eye tracking sensor or sensors.

The device's processor(s) and software may be configured to translate the gaze or motion of the user's eyes into at least one symbol or command, and then transmit this at least one symbol or command using the device's wireless transceiver.

When the head-mounted frame is an eyeglasses frame, the eyeglass lenses may or may not have optical correction capability. That is, the eyeglass lenses may be customized for the particular optical correction needs for an individual user, or alternatively may be of a standard non-customized type configured either for a user with good uncorrected vision, or a user who has his or her vision corrected by other means, such as contact lenses.

The device may often be used at night, in dimly lit restaurants, and under other low light conditions where there may be insufficient ambient light for the device's eye tracking sensor (often a miniature video camera) to get a good image of the user's eye. In order to be capable of performance under a wide variety of different ambient lighting conditions, while at the same time not drawing attention to the user, the eye tracking sensor may include at least one near infrared light source configured to illuminate the same user eye or eyes that are also being monitored by the device's video camera(s). However, visible light sources may also be used. Light Emitting Diodes (LED) lights can be used for this purpose.

Infrared light sources, particularly near-infrared light sources (e.g., light sources between about 700 nm and 1200 nm or longer wavelengths) are preferable simply because, if visible light sources are used to illuminate the user's eye in a low ambient light environment, the user's visibly lit eye or eyes will also be apparent to other individuals in the vicinity, thus defeating one purpose of the invention, which is to allow the user to communicate inconspicuously. In order to do this, the video camera focused on the user's eye is preferably capable of operating with good sensitivity in infrared wavelengths. Standard light detecting sensors, such as charged coupled devices (CCD), are fortunately quite capable of working in the near infrared region, and may be used for this purpose.

A number of different types of optical systems may be used in order to display data to the user in an inconspicuous manner. One type of optical system may comprise a miniature display device, which may be built into the stem of the eyeglass frame, such as on the inside near the eyeglass lens, along with a converging lens or mirror, and a beam splitter which may, in some embodiments, be mounted on the interior (user's eye side) of at least one eyeglass lens.

For example, in one embodiment, a beam splitter or prism may be mounted on the inside of the eyeglass lens in a manner roughly similar to that of the position of the bifocal correcting portion of a bifocal lens. In this configuration, when the user looks up, the user will see past the beam splitter and will be able to see the outside environment with no optical interference whatsoever. However, when the user looks down, the user will see both the outside environment, and the virtual image of the miniature display device. Here an optical correction device, such as a converging lens, may be mounted either on or near the miniature display device, or on or near the beam splitter, or in between. This optical correction device can take the image generated by the miniature display device, and display the image as if the image was coming from a longer distance away, thus allowing the user's eyes, while focused on more distant objects in the outside environment, to see the image generated by the display floating superimposed with the outside objects and in sharp focus.

The beam splitter arrangement may be further concealed by configuring the eyeglasses to resemble standard sunglasses, and by making the lenses from optically dark or reflecting material. Thus, the beam splitter arrangement will be hidden, and the user, who is apparently only wearing sunglasses, may thus communicate without attracting attention from outside persons.

A variety of different display technologies may be used for the display device. These display technologies include, but are not limited to, Liquid Crystal Displays (LCD), Organic light emitting diode displays (OLED), and Electronic paper displays.

Although a user may move his eyes to designate both symbols for transmission, as well as control signals (i.e., transmit message, show next message, erase, and so on) without preselected targets, in a preferred embodiment, the optical display may also show one or more targets for the user to gaze upon. These targets may include control targets, as well as targets for symbols, such as numbers or letters of the alphabet, that the user may wish to gaze upon in order to create messages to transmit.

The device may contain one or more wireless transceivers, configured to transmit and receive either short range wireless (e.g., with a typical range under 300 feet) or longer range wireless (such as cellular telephone wireless), often capable of being transmitted over longer distances of at least several miles or more. Examples of suitable short range wireless protocols include the various IEEE 802.15 protocols such as BlueTooth™, Zigbee™ protocols, as well as other protocols such as the various IEEE 802.11 WiFi protocols. Examples of suitable longer range wireless protocols include cellular telephone 0G, 1G, 2G, 3G, 4G, protocols, GSM, GPRS, CDMA, EV-DO, DECT, IS-136/TDMA, iDEN, GSM EDGE standards, 2-way-wireless-messaging FM transmissions, and other wireless communications modalities that transmit signals beyond a radius of approximately 300 feet.

The device could include at least one battery to power the various components. This battery may be a single use battery, but could also be a rechargeable battery. If a rechargeable battery is used, often the device will be sold with a battery recharging device, such as a recharging stand that can in turn plug into a standard AC wall socket, and recharge the battery. Alternative power sources, such as frame mounted solar cells to recharge the battery, plug in automobile chargers, etc. may also be used.

FIG. 1 shows an overview of the device 100, showing the head-mounted or mountable frame (here, an eyeglass frame) 102. This head-mounted or mountable frame 102 is often divided into a frame front 104 and two frame temples 106 that extend over or behind the ears to hold the head-mounted frame in place. The frame will often have one or usually two lenses, such as eyeglass lenses or sunglasses lenses 108 and 110.

The device will often have an optical system, that may consist of a display 112, a display lens or mirror such as a converging lens or mirror 114, and a beam splitter 116 which may either be mounted on the eyeglass lens 108 or may be held separately.

The device's eye tracking sensor, which in this embodiment is one or more miniaturized video camera(s), is shown as 118. One or more eye illumination lights, such as near infrared lights, configured to shine near infrared light onto at least one of the user's eyes 120 is shown as 122.

Figure 2:
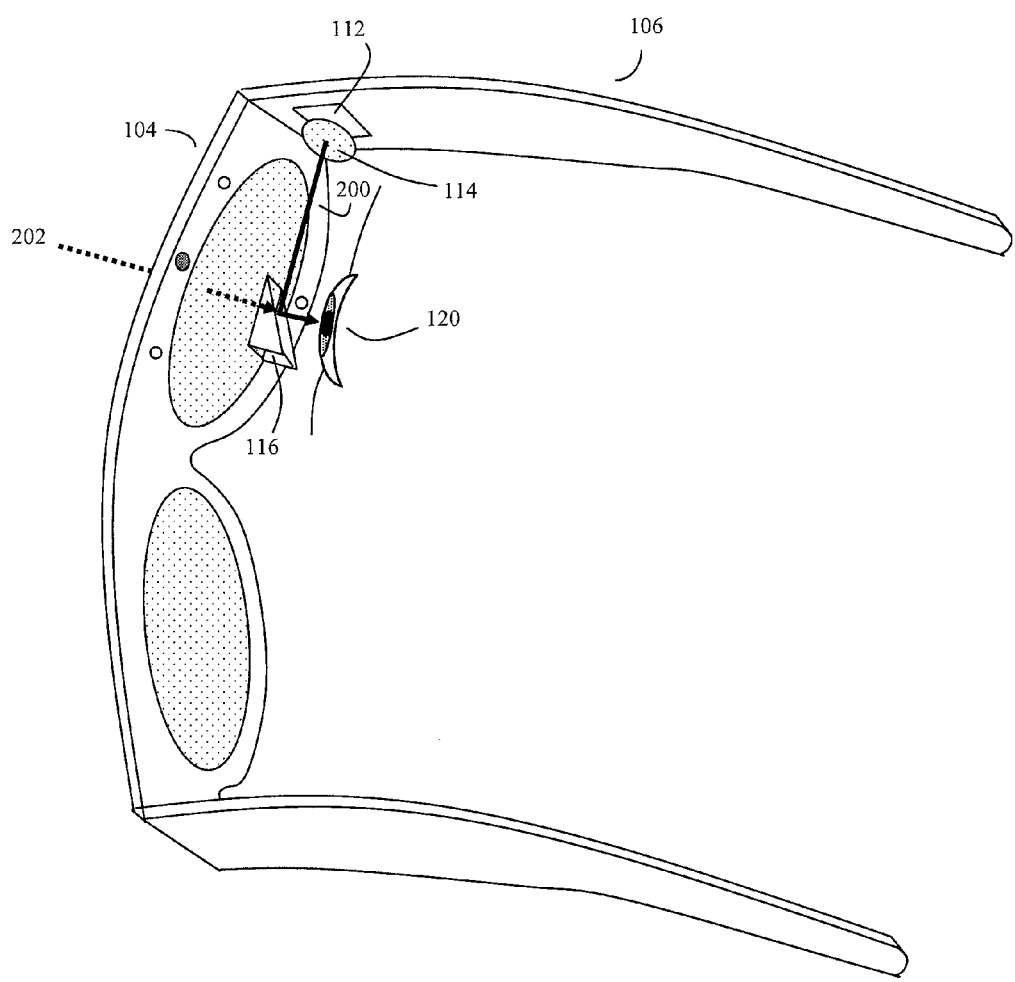
FIG. 2 shows an embodiment of the device's beam splitter optical display.

FIG. 2 shows one example of how the visual display may work. The display 112, which may be located in the inner portion of the frame temple 106 near the frame front 104, may display a message—for example a brief text message from the user's next appointment such as "Need to change meeting to 4:00 PM" The display 112 will show this message. Depending upon the type of display used and environmental conditions, the display may be back lit or illuminated (not shown) to provide better contrast.

The display will often be located too close to the user's eye 120 for the eye to focus on properly. To correct for this, the display may be imaged by a mirror or lens, such as a converging lens 114, to correct the light rays 200 so that they appear to be coming from a more distant virtual object. The light rays then may pass through the beam splitter 116, and into the user's eye 120. The user will see the image of the display and the message as if the display and message were floating in the air 202 in front of the user. At the same time, the user will also be able to see distant objects through the eyeglasses lenses as well. Although only a one eye display is shown in these examples, this optical system may be replicated on the other side of the frame as well, thus allowing both of the user's eyes to see the message. This dual optical system embodiment, although more expensive to produce, will likely be appreciated by users who wish a more premium experience.

Figure 3:
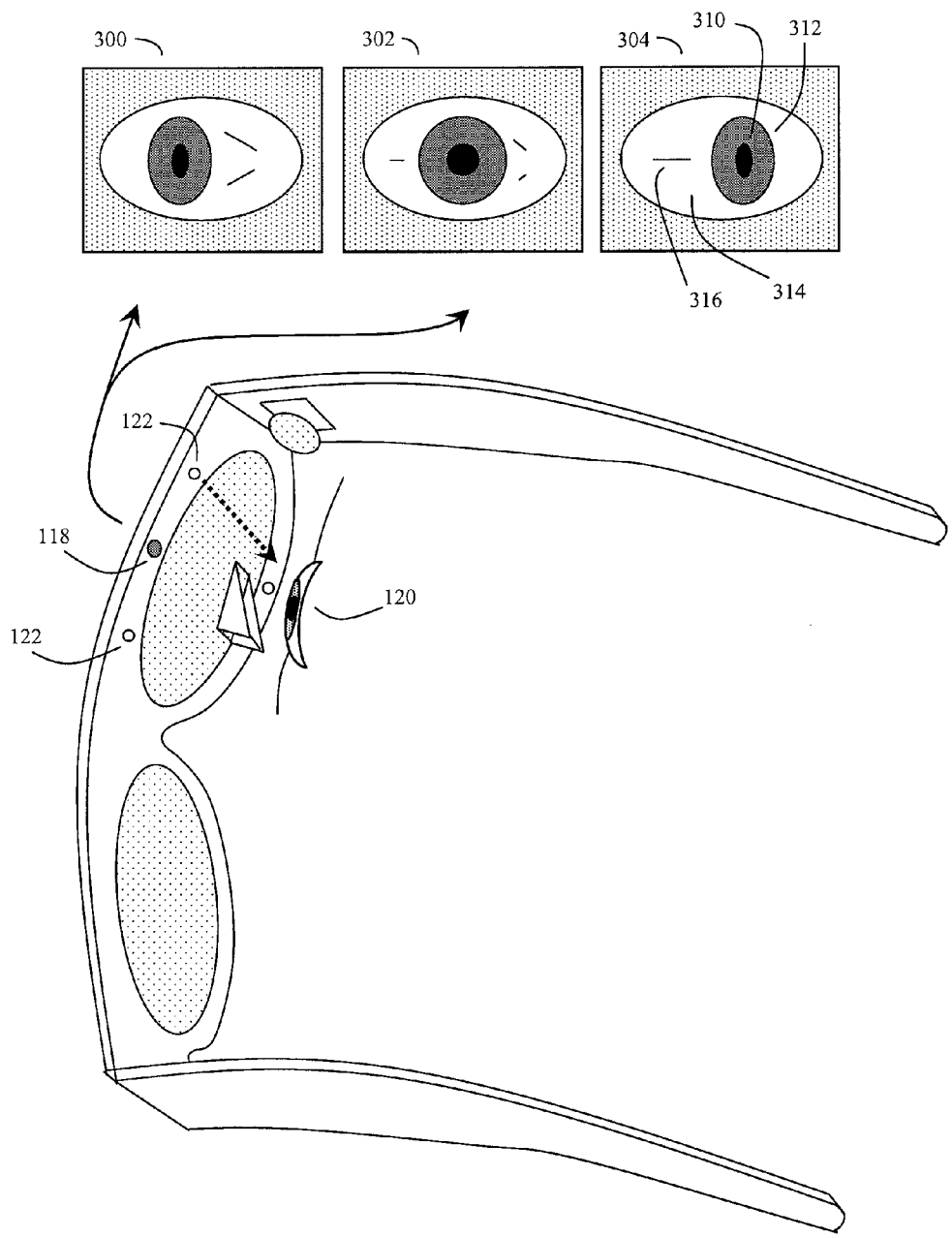
FIG. 3 shows an embodiment of the device's eye tracking system.

FIG. 3 shows one example of how the eye tracking sensor may track the motion of the user's eye 120. The user's eye 120 is illuminated by near infrared light from one or more frame mounted infrared lights 122. The frame mounted video camera 118, which is focused on the user's eye 120, captures images of the eye 120 as the eye gazes in different directions, and looks at different virtual targets presented by the visual display system. Some of the images captured by video camera 118 as the eye 120 looks in different directions shown as 300, 302, and 304. In direction 300, the eye is looking to the left, in direction 302, the eye is looking straight ahead, and in direction 304, the eye is looking to the right. In many embodiments, the eye tracking sensor will be mounted or coupled directly to the frame. In other embodiments, the eye tracking sensor will not be integrally mounted or coupled to the frame, but may rather be attached and detached from the frame, and thus in these embodiments, the eye tracking sensor system is said to be couplable to the frame.

Although only one eye tracking sensor is shown in these examples, this eye tracking sensor may be replicated on the other side of the frame as well, thus allowing both of the user's eyes to be tracked. Again, this dual eye tracking embodiment, although more expensive to produce, will again likely be appreciated by users who wish a more premium experience, and it is likely that tracking both of the user's eyes will also improve the accuracy of the eye gaze tracking system.

The video camera 118 can look at a number of different visual elements of the eye. These elements include the relative shape and location of the pupil 310, the iris 312, and sclera 314 of the eye, along with assorted blood vessels 316, and other distinguishing marks on the sclera. In addition to these features, motion of other eye structures, such as the eyelids, blinking rates and patterns, squinting, etc. may also be monitored.

Figure 4:
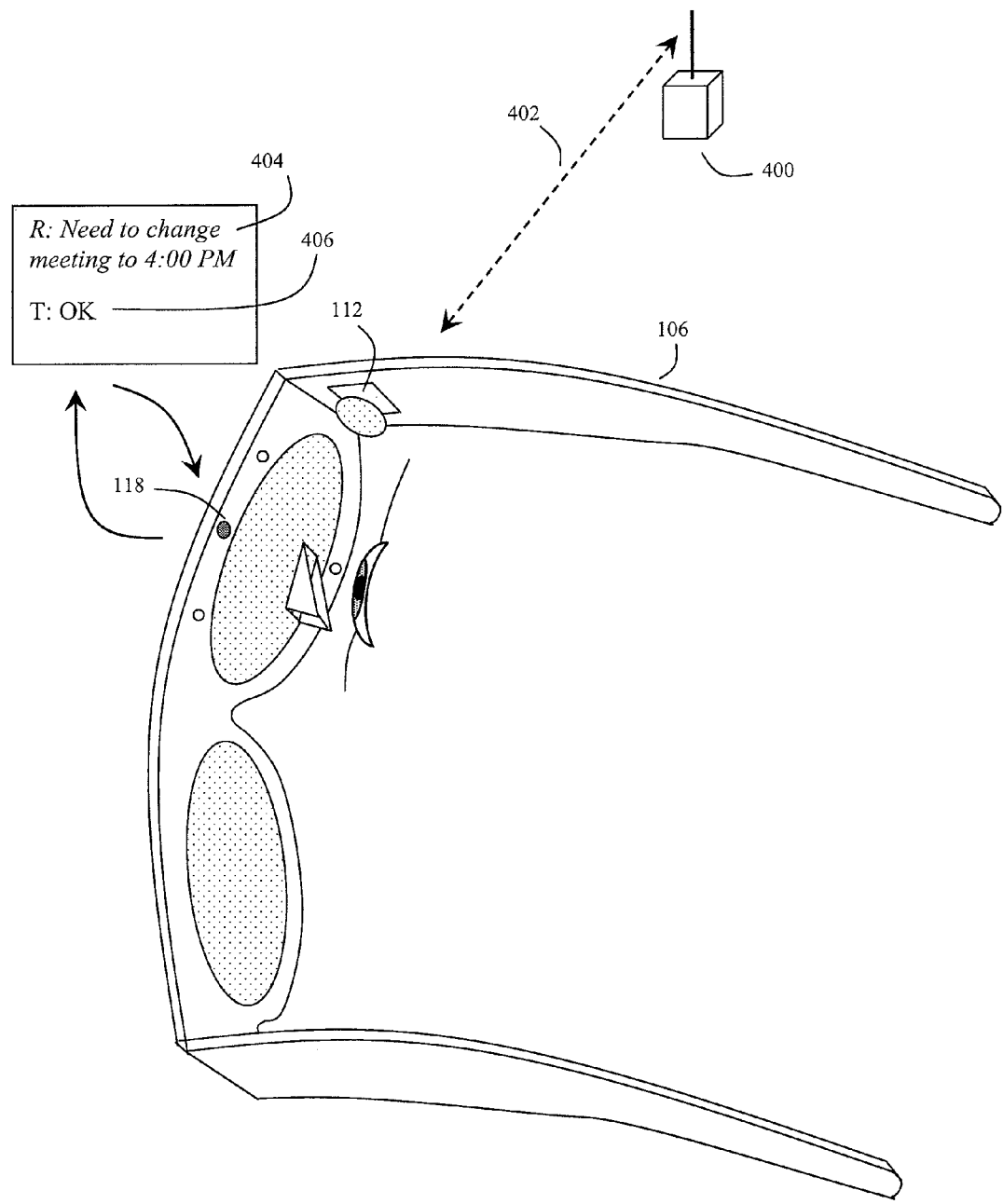
FIG. 4 shows the device communicating with a cellular phone base station.

FIG. 4 shows the device wirelessly communicating with a cellular phone base station. In this figure, a wireless transceiver onboard the device (for example, a miniaturized transceiver circuit, antenna, and battery that may be embedded in the temple portion of the device's frame 106) has received a wireless incoming message from a cellular phone tower 400 by way of a standard cellular phone wireless protocol, such as the previously discussed 0G, 1G, 2G, 3G or 4G protocol, GSM, GPRS, CDMA, EV-DO, EDGE, DECT, IS-136/TDMA, iDEN or other protocol 402. This incoming message is processed by an onboard processor (e.g., microprocessor) and software, and is output on display 112, in this example as the received text message "Need to change meeting to 4:00 PM" The user will use the optical system to see a virtual image of this text message appearing as if floating in the air in front of them, as indicated by 404.

The user, who may, for example, be at a restaurant talking to another client, can unobtrusively receive this text message, and then by various eye motions, which will be detected by video camera 118, processed by the device's processor and eye tracking software, and converted into a return message along with a transmit command. For example, the transmitted message 406 may be "OK" This message will be wirelessly transmitted (i.e., using protocol 402) back to the cellular telephone base station 400 or other network, and from there to the client on the other end of the text message conversation.

Figure 5:
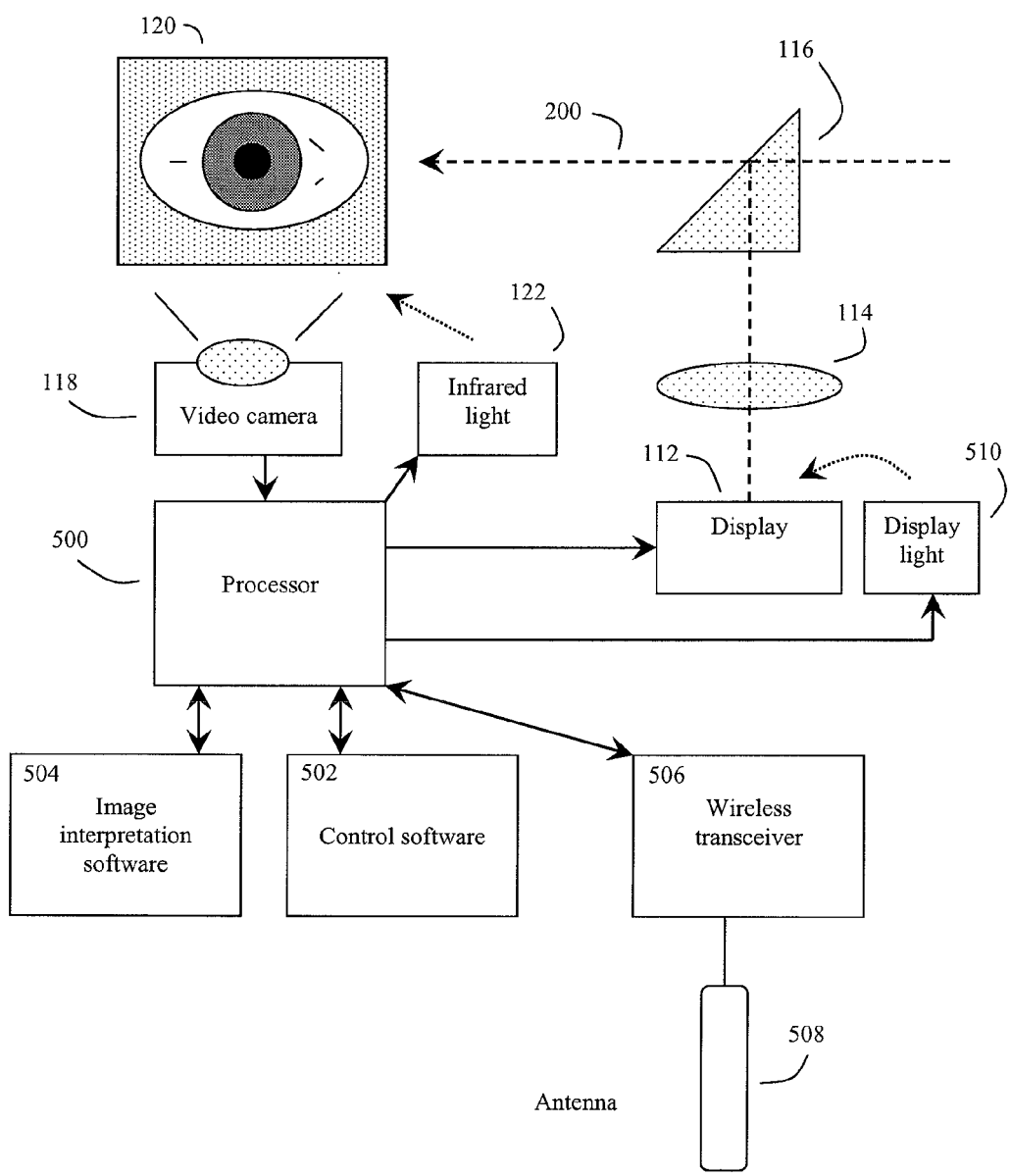
FIG. 5 shows the electrical circuitry of the device.

FIG. 5 shows a detail of some of the electrical and optical circuitry that may be used in the device. The device may be controlled by one or more processors 500, which may be microprocessors, possibly assisted, supplemented, or supplanted by one or more digital signal processors (DSP). The processor(s) in turn executes code or software, such as general control software 502 and image interpretation software 504 intended to analyze images of the eye returned from video camera 118, and determine from these images information pertaining to the direction of eye gaze, as well as various control signals, which may be conveyed by squinting, blinking, unusual eye movement and the like that may be useful for controlling the device.

The processor(s) 500 may operate one or more wireless transceivers 506, which in turn may be connected to an antenna 508, which may be incorporated or embedded into the head-mounted frame, such as the eyeglasses frame. The processor will also send data to a display 112 for viewing by the user through optical system lens components 114 and beam splitter components 116. The processor may optionally control a display illumination light 510 to improve display visibility as needed.

The eye tracking software may be implemented using a variety of different types of image interpretation software. Some of these methods include the methods of Oyewole Oyekoya, "*Eye Tracking, A Perceptual Interface for Content Based Image Retrieval*", Ph.D. Thesis 2007, Department of Electronic & Electrical Engineering, Adastral Park Campus, University Park London. Alternative methods include the methods of Selker et. al., "*Eye-R, a glasses mounted-eye motion detection interface*", Conference on Human Factors in Computing Systems, CHI '01 extended abstracts on Human factors in computing systems, pages 179-180, and other methods.

The human eye has a number of structures, such as the pupil, iris, and sclera which artificial vision software can use to track the eye, and determine where the eye is pointing or gazing at any given moment of time. However, using the gaze of the eye to control devices is complicated by the fact that the position of the eye is constantly shifting. The human eye does not gaze at objects of interest in a steady uniform manner, but rather, scans objects of interest by a series of saccades or rapid eye movements. In this respect, the human eye acts much like a cross between a camera and a scanner, and indeed, this scanning motion helps make up for the inherent deficiencies and limitations of the eye in terms of its performance as a natural camera.

In order to compensate for this constant movement, the eye tracking software and processor must take this natural constant saccade movement into account. Other workers in the field, such as Oyekoya, have shown that when such constant movement is compensated for, eye gaze can be an effective way to understand user intentions, and in fact in some situations eye gaze can even select objects of interest faster than alternative user interfaces, such as computer mice.

The automated interpretation of human eye gazing is facilitated if the automated interpretation system knows the location of the objects of interest or targets that the eye is likely to be gazing upon. The automated system can then use its knowledge about the location of these targets, often called salient images, to help interpret the series of eye movements as detected by the artificial vision software. Here, this target information is known because the invention is displaying these targets in specific locations in the invention's display 112.

Here, the eye tracking software may operate by first storing in memory the location of various visual display targets, such as symbol targets and control targets that the system is displaying on display 112. The software may then process eye movement data and attempt to determine which target the eye is gazing on by, for example. making use of algorithms such as the Oyekoya eye gaze interpretation software algorithms. These algorithms include steps such as determining if the eye is revisiting on particular target regions, and determining if the eye has a tendency to visit the target region just prior to the main incidence of target fixation. The speed of the eye saccade may also be used to give relevant information, because saccade speeds tend to slow down right before the target image of interest is selected. Other methods include determining changes in eye pupil diameter, because pupil diameter can tend to change when the eye is gazing upon an intended target region. Dwell time on the target may also be used because this also gives important information that the eye is fixing on a particular target.

The eye tracking software will often also use various statistical methods, such as Analysis of Variance (ANOVA) to analyze the eye tracking data, as well as to calibrate itself to the individual characteristics of any given user.

Many different types of visual interfaces may be used to control the device. One example of such a visual interface is taught by the methods of Kozma et. al., "GaZIR: Gaze-based Zooming Interface for Image Retrieval", ICMI-MLMI 2009, 2-6 Nov. 2009, Cambridge, Mass., USA, or other method. The GaZIR interface utilizes a gaze based zooming interface to allow the user to progressively zoom in on targets of interest by continuing to gaze at them. Here for example, the interface controls the speed of appearance of new letters based upon information determined by the user's gaze.

Figure 6:
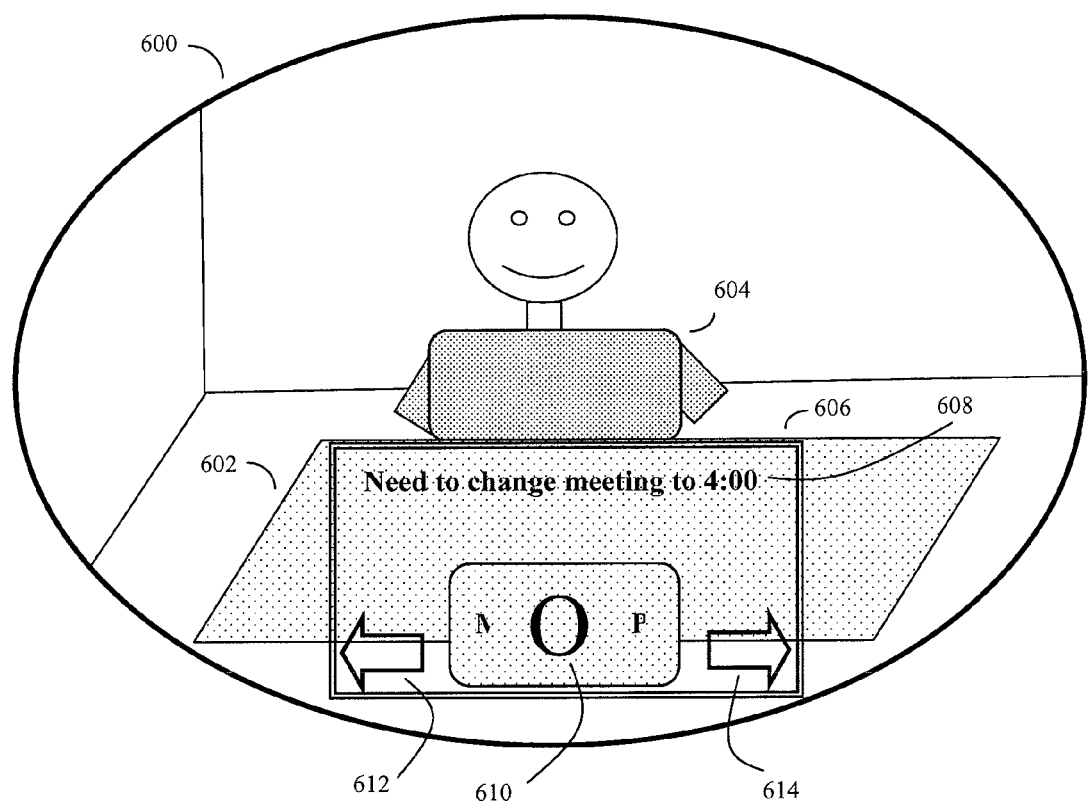
FIG. 6 shows an example of a user interface for the device.
Figure 6:
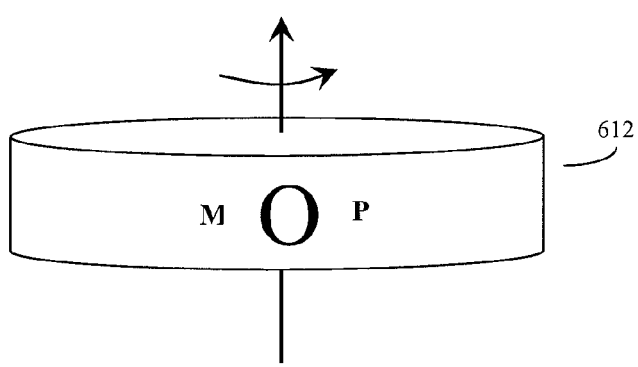

One embodiment of the invention's visual interface is shown in FIG. 6. Here the user is wearing the device, and the overall view 600 shows the user's view, as if peering out through glasses. The user is sitting at desk or restaurant table 602 across from another person 604, and the view of the other person and other outside world objects in the upper part of the scene is unobstructed. In the lower part of the scene, the user sees both a view of the outside world, and a view 606 of the display 112 as conveyed to the user's eye by way of correcting lens 114 and beam splitter 116. As previously shown, here the beam splitter is again placed in the lower portion of the field of view, in a manner similar to a bifocal lens arrangement.

In the upper portion of the display 606, the user sees a view of an incoming message, such as a text message 608, which has been received by the device's transceiver. In the lower part of the display, the user is operating a gaze based interface to select the letter "O" to form the desired "OK" response to transmit. In this example, various symbols (e.g., letters) 610 intended for transmission zoom in and out of view as if the letters were rotating on the surface of a virtual wheel 612 spinning perpendicular to the user. Note that here, this "virtual wheel" is a software construct, generated by executable code, and the use of the "virtual wheel" model is intended to convey in simple terms some of the various functions that the device's display software may employ in the process of generating the visual user interface.

In addition to displaying letters, various control symbols, for example symbols for "space," "backspace," "capital letters," "send," "receive", "next message," "previous message" and the like may also be put on the surface of the virtual wheel 612 and displayed to the user.

In some embodiments, it may be useful to group the letters not in standard alphabetical order, but rather grouped according to frequency of use, so that the most common letters in the user's language of choice are grouped together. For example, for English, the letters used in the highest frequency on average are, in order from most frequently used to least frequently used is: "E T A O I N S H R D L C U M W F G Y P B V K J X Q Z". Thus it may be useful to group the letters by frequency of use so that the user time required to scroll to a particular letter is reduced accordingly. With use, the device might also start to learn what any given user's particular choice of letter use or other symbol use is, and adjust the position of these letters and symbols on the interface accordingly so as to improve efficiency.

In addition to letters, numbers, and control characters, simple phrases, such as "OK," "Yes," "No," "Busy," "Get back to you soon," and so on, along with various user determined pre-coded messages, may also be encoded as particular symbols. Indeed, such phrases may be pre-encoded along with the appropriate commands to reply to an incoming message and transmit, so that a user need simply glance at the symbol for OK for a sufficient time, and the system will know to then respond to any incoming text message with this response. The device may also be programmed append additional explanatory text, such as "sent from an eye-gaze commanded device" or the manufacturer's proprietary name for the device, so that the recipient of the return message will not be put off or offended by the occasionally brief or terse nature of the response.

In one user interface embodiment, the user may select which letters, numbers, or control symbols to use by gazing at a left rotate 612 and right rotate 614 control target, which may control the order in which the letters are displayed by, for example, rotating the virtual wheel 612 in the selected direction. The user can then select the desired letters numbers, or control symbols by gazing at the displayed letters, numbers, or control symbols for a sufficient amount of time to let the system know that this letter number, or control symbol is desired.

Many other alternative embodiments are possible. In one alternative embodiment, the virtual wheel 612 used to determine the order in which letters, symbols and control elements or symbols are displayed can be a virtual sphere, and the user can rotate this sphere around more than one axis by appropriate gazing at control targets. In another alternative environment, more than one type of virtual wheel 612 may be used, for example one for the alphabet, one for predetermined messages, one for numbers, one for control commands, one to speed dial frequent contacts, to further enhance the speed and flexibility of the interface.

Figure 7B:
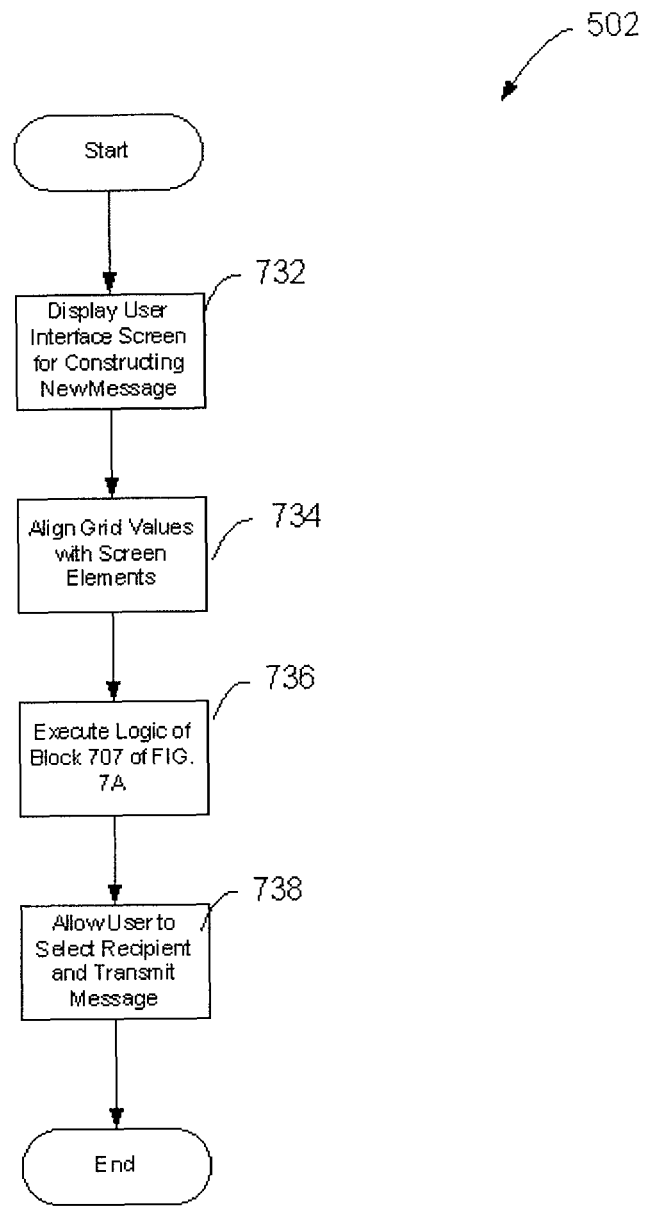

FIGS. 7A-7B are flowcharts showing processing steps capable of being carried out by the control software 502 of the device. It is noted that the control software 502 could be coded in any suitable high- or low-level programming language (e.g., C, C++, Java, etc.), and could be embodied as computer-readable instructions stored in non-volatile memory. The steps discussed in connection with FIGS. 7A-7B are illustrative in nature, and it is conceivable that other control approaches could be developed and are considered within the scope and spirit of the present invention.

The process steps shown in FIG. 7A permit a user of the device to view an incoming message (e.g., a text message, e-mail, etc.), and to construct and transmit a reply using the device. Beginning in step 702, an incoming message is received by the device (e.g., wirelessly, using the wireless transceiver 506 and the antenna 508 of FIG. 5). Then, in step 704, the processor 500 displays a user interface screen which includes the received message on the display 112. In step 706, the processor 500 aligns grid values with screen elements forming part of the user interface screen. At this point, the message has been displayed to the user, and the logic of block 707 is executed. Block 707 permits the user to construct a message (e.g., a reply message) using the display 112.

In step 708, the processor continuously monitors the user's eye position using images of the user's eye acquired by the video camera 118 and the image interpretation software 504, for the purpose of allowing a user to construct a reply message. The reply message could be constructed using the virtual wheel discussed above, a virtual keyboard, or any other suitable interface. In this step, the processor 500 determines grid coordinates which correspond to the user's pupil, in order to determine where the user's eye is looking on the screen. In step 710, the processor 500 determines whether the user wishes to advance one letter, symbol, or number. Thus, for example, if the user interface screen is displaying the virtual wheel discussed above, the processor 500 can determine if the user is looking at a screen element for advancing the wheel one letter. If so, step 712 occurs, wherein the processor 500 advances the virtual wheel one letter, symbol, or number, and updates the display 112 to reflect same, and control returns to step 708. Otherwise, step 714 occurs.

In step 714, the processor determines whether the user wishes to go back one letter, symbol, or number. If so, step 716 occurs, wherein the processor 500 moves the virtual wheel back one letter, symbol, or number, and updates the display 112 to reflect same, and control returns to step 708. Otherwise, step 718 occurs. In step 718, a determination is made as to whether a letter, number, or symbol has been selected by the user. If so, step 720 occurs; otherwise, control returns to step 708. In step 720, the processor 500 constructs the message using the selected letter, and updates the display 112 to show the message being constructed. In step 722, a determination is made as to whether the message is complete. If not, control returns to step 708. Otherwise, step 724 occurs, wherein the processor 500 processes the complete reply into a format suitable for transmission to the recipient (e.g., as a reply text message or as a reply e-mail) and transmits the message using the wireless transceiver 506 and the antenna 508.

As shown in FIG. 7B, the software 502 also allows a user to create and send a new message to a recipient, using the device. Beginning in step 732, the processor 500 displays a user interface screen for allowing the user to create a new message. The display could include the virtual wheel discussed above, a virtual keyboard, or any other suitable interface. In step 734, the processor 500 aligns grid values with the various screen elements, which, as discussed above, are used by the processor 500 to determine whether the user has selected a specific screen element. In step 736, the logic of block 707 of FIG. 7A, discussed above, is executed, so that the user can create a new message using the device. When a new message has been successfully created, step 738 occurs, wherein the processor 500 causes the display 112 to display a list of recipients (e.g., a pre-defined list of the user's contacts, e-mail addresses, telephone numbers, etc.), whereupon the user can select the desired recipient from the list and the message is transmitted to the selected recipient. Alternatively, the user could specify a desired e-mail address, phone number, etc., using the virtual wheel or other interface. As can be appreciated, the processing steps discussed above in connection with FIGS. 7A-7B allow a user to communicate using eye movements which are monitored by the present invention. Of course, the processing steps shown in FIGS. 7A-7B could be carried out continuously and in real time.

The invention claimed is:

1. A self-contained, head-mountable, vision-controlled device for wirelessly transmitting and receiving text information in an inconspicuous manner using only eye-gaze direction control, comprising:
   a head-mountable frame configured to hold a lens in front of an eye of a user;
   at least one user eye-tracking sensor positioned to optically track gaze direction of one or both eyes of the user;
   at least one processor programmed to execute eye tracking executable code and control executable code to rotate a virtual surface interface using only eye gaze direction mediated commands;
   at least one optical system configured to render a virtual image of a visual display viewable by a user of said device, said optical system spatially positioned within a boundary defined by said lens in front of the eye of the user;
   wherein said visual display displays at least one target for a symbol intended for wireless transmission when said eye of the user is directed toward said target, said target being positioned on a rotating virtual surface spinning perpendicular to the user's eye gaze direction;
   at least one wireless transceiver mounted on said frame, said wireless transceiver receiving wireless information and transmitting said wireless information to said optical system;
   at least one battery mounted on said frame to power said at least one eye tracking sensor, said at least one processor, said at least one wireless transceiver, and said at least one visual display; and
   wherein said at least one processor programmed to execute said executable eye tracking code, and said executable control code causing said eye-tracking and display device to transmit wireless information by tracking the gaze direction of said eye of said user with said eye tracking sensor, and using only the gaze direction of said eye of said user as input translating the gaze direction of said eye of said user into rotating or moving said virtual surface to display at least one symbol or command, selecting said at least one symbol or command, constructing text to be transmitted, and transmitting said text using said at least one wireless transceiver.

2. The device of claim 1, wherein said lens is free of optical correction characteristics, or wherein said lens includes optical correction characteristics customized to the optical correction needs of said eye of said user.

3. The device of claim 1, wherein said eye tracking sensor comprises at least one near infrared light source and at least one video camera or sensor configured to detect near infrared light;
   wherein said at least one near infrared light source is configured to shine near infrared electromagnetic radiation into at least one eye of said user; and wherein said at least one video camera or sensor is configured to focus on said at least one eye of said user.

4. The device of claim 1, wherein said optical system comprises a beam splitter and a converging lens or converging mirror.

5. The device of claim 1, wherein said visual display is selected from any of the following, Liquid Crystal Displays (LCD), Organic light emitting diode displays (OLED), or Electronic paper displays.

6. The device of claim 1, wherein said transceiver is selected from any of the following, Bluetooth, Zigbee, WiFi, 0G, 1G, 2G, 3G, 4G, GSM, GPRS, CDMA, EV-DO, DECT-IS136/TDMA, iDEN, GSM EDGE 2-way-wireless-messaging FM transmissions, or other wireless communications modalities that transmit signals beyond a radius of approximately 300 feet.

7. The device of claim 1, wherein said head-mounted frame has the appearance of an eyeglasses frame.

8. The device of claim 1, wherein said device is configured to allow said user to select using only eye gaze direction commands which said at least one symbol or command to use by gazing at a non-moving control target, in response to which said processor is configured to rotate or moves said virtual surface spinning perpendicular to the user's eye gaze direction, thus bringing into view various symbols or commands on said virtual surface that were not previously in view, thus allowing said user to then select the user desired symbols or commands by gazing at said user desired symbols or commands.

9. The device of claim 1, further displaying an eye gaze selectable list of recipient email addresses, telephone numbers, control elements, short phrases, alternative alphabets, or numbers on said rotating or moving virtual surface.

10. A self-contained, head-mountable, vision-controlled device for wirelessly transmitting and receiving text information to and from a user in an inconspicuous manner using only eye gaze direction control, comprising:
    a head-mountable frame configured to hold a lens in front of an eye of the user;
    at least one user eye-tracking sensor mountable on said frame, said eye tracking sensor comprising at least one near infrared light source and at least one video camera or sensor configured to detect near infrared light;
    wherein said at least one near infrared light source is configured to emit near infrared electromagnetic radiation onto at least one eye of said user;
    and wherein said at least one video camera or sensor is configured to focus onto said at least one eye of said user;
    at least one processor programmed to execute executable eye tracking code and executable control code to rotate a virtual surface interface using only eye gaze direction mediated commands;
    at least one visual display and optical system mountable on said frame; said optical system comprising a beam splitter and a converging lens or converging mirror, said optical system configured to generate a virtual image of said visual display viewable by the user of said device and said optical system spatially dimensioned within a periphery of said lens in front of the eye of the user;
    wherein said visual display displays at least one target for a symbol intended for wireless transmission when said eye of said user is directed at said target, said target being positioned on a rotating virtual surface spinning perpendicular to the user's eye gaze direction;
    at least one wireless transceiver mountable to said frame;
    at least one battery mounted on said frame to power said at least one eye tracking sensor, said at least one processor, said at least one wireless transceiver, and said at least one visual display;
    wherein said wireless transceiver wirelessly receives information and wirelessly transmits said information to said visual display; and
    wherein said at least one processor, said executable eye tracking code, and said executable control code directing said eye-tracking and display device to wirelessly transmit information by optically tracking the eye gaze direction of said eye of said user via said eye tracking sensor, and using only the eye gaze direction of said user as input, translating the gaze direction of said eye of said user into rotating or moving said virtual surface to display at least one symbol or command, selecting said at least one symbol or command, constructing text to be transmitted, and transmitting said text using said at least one wireless transceiver; and wherein said device is configured to allow said user to select which said at least one symbol or command to use by gazing at a non-moving control target, in response to which said processor is configured to rotate or move said virtual surface, thus bringing into view various symbols or commands on said virtual surface that were not previously in view, thus allowing said user to then select the user desired symbols or commands by gazing at said user desired symbols or commands.

11. The device of claim 10, wherein said lens is free of optical correction characteristics, or wherein said lens includes optical correction characteristics customized to the optical correction needs of the eye of the user.

12. The device of claim 10, wherein said visual display includes any of the following, Liquid Crystal Displays (LCD), Organic light emitting diode displays (OLED), or Electronic paper displays.

13. The device of claim 10, wherein said transceiver is selected from any of the following, Bluetooth, Zigbee, WiFi, 0G, 1G, 2G, 3G, 4G, GSM, GPRS, CDMA, EV-DO, DECT-IS136/TDMA, iDEN, GSM EDGE 2-way-wireless-messaging FM transmissions, or other wireless communications modalities that transmit signals beyond a radius of approximately 300 feet.

14. The device of claim 10, wherein said head-mounted frame is shaped and dimensioned as an eyeglasses frame.

15. The device of claim 10, wherein said lens includes any of the following properties, non-reflective, reflective, clear, optically dark sunglass lens, or transition lens that becomes optically dark in response to UV light.

16. The device of claim 10, further displaying an eye gaze selectable list of recipient email addresses, telephone numbers, control elements, short phrases, alternative alphabets, or numbers on said rotating or moving virtual surface.

17. A self-contained, head-mountable, vision-controlled device for transmitting and receiving wireless text information by a user in an inconspicuous manner using only eye gaze direction control, comprising:

a head-mounted frame configured to hold a lens in front of an eye of the user;

wherein said head-mounted frame has the appearance of an eyeglasses frame;

wherein said lens is free of optical correction characteristics, or wherein said lens includes optical correction characteristics customized to the optical correction needs of the user;

at least one user eye-tracking sensor coupleable to said frame, said eye tracking sensor comprising at least one near infrared light source and at least one video camera or sensor configured to detect near infrared light; wherein said at least one near infrared light source is configured to emit near infrared electromagnetic radiation into said eye of said user;

and wherein said at least one video camera or sensor is configured to capture an optical property of said eye of said user;

at least one processor programmed to execute executable eye tracking code and executable control code to rotate a virtual surface interface using only eye gaze direction mediated commands;

at least one visual display and optical system couplable to said frame; wherein said visual display is selected from any of the following, Liquid Crystal Displays (LCD), Organic light emitting diode displays (OLED), or Electronic paper displays;

said optical system comprising a beam splitter and a converging lens or converging mirror; said optical system configured to generate a virtual image of said visual display viewable by said user, said optical system further configured to spatially fit within a boundary defined by said lens in front of the eye of the user;

wherein said visual display displays at least one target for a symbol intended for wireless transmission when said eye of said user is directed at said target, said target being positioned on a rotating virtual surface spinning perpendicular to the user's eye gaze direction;

at least one wireless transceiver coupleable to said frame;

at least one rechargeable battery mounted on said frame to power said at least one eye tracking sensor, said at least one processor, and said at least one visual display;

wherein said wireless transceiver wirelessly receives information and wirelessly transmits said information to said visual display; and wherein said at least one processor, said executable eye tracking code, and said executable control code direct said device to wirelessly transmit information by optically tracking the eye gaze direction of the eye of said user in response to said eye tracking sensor, and using only the eye gaze direction of said user as input translating the motion gaze direction of said eye of said user into rotating or moving said virtual surface to display at least one symbol or command, selecting said at least one symbol or command, constructing text to be transmitted, and transmitting said text using said at least one wireless transceiver;

wherein said device is configured to allow said user to select which said at least one symbol or command to use by gazing at a non-moving control target, in response to which said processor is configured to rotate or move said virtual surface, thus bringing various symbols or commands on said virtual surface that are not previously into view into view, thus allowing said user to then select the user desired symbols or commands by gazing at said user desired symbols or commands; and wherein said transceiver is selected from any of the following Bluetooth, Zigbee, WiFi, 0G, 1G, 2G, 3G, 4G, GSM, GPRS, CDMA, EV-DO, DECT-IS136/TDMA, iDEN, GSM EDGE 2-way-wireless-messaging FM transmissions, or other wireless communications modalities that transmit signals beyond a radius of approximately 300 feet.

18. The device of claim 17, wherein said lens comprises a reflective lens or optically dark sunglass lens.

19. The device of claim 17, further displaying an eye gaze selectable list of recipient email addresses, telephone numbers, control elements, short phrases, alternative alphabets, or numbers on said rotating or moving virtual surface.

* * * * *